United States Patent
Das et al.

(10) Patent No.: US 10,417,892 B2
(45) Date of Patent: Sep. 17, 2019

(54) DYNAMIC VIRTUAL FENCING FOR A HAZARDOUS ENVIRONMENT

(71) Applicant: Siemens Aktiengesellschaft, München (DE)

(72) Inventors: Saptarshi Das, Bangalore (IN); Siddharth Das, Karnataka (IN); Karthik Ragunathan, Plainsboro, NJ (US)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 14/968,859

(22) Filed: Dec. 14, 2015

(65) Prior Publication Data

US 2016/0171862 A1    Jun. 16, 2016

(30) Foreign Application Priority Data

Dec. 15, 2014 (EP) .................................. 14198013

(51) Int. Cl.
    *G08B 21/00* (2006.01)
    *G08B 21/02* (2006.01)
    *G05B 9/02* (2006.01)

(52) U.S. Cl.
    CPC ............... *G08B 21/02* (2013.01); *G05B 9/02* (2013.01)

(58) Field of Classification Search
    CPC .................................. G08B 21/02; G05B 9/02
    See application file for complete search history.

(56) References Cited

U.S. PATENT DOCUMENTS

| | | | |
|---|---|---|---|
| 6,169,497 B1 | 1/2001 | Robert | |
| 6,917,300 B2 * | 7/2005 | Allen | ........................ G08G 1/20 340/539.13 |
| 7,477,952 B2 | 1/2009 | Bieber | |

(Continued)

FOREIGN PATENT DOCUMENTS

| | | |
|---|---|---|
| CN | 103180522 A | 6/2013 |
| CN | 103192785 A | 7/2013 |

(Continued)

OTHER PUBLICATIONS

European Search Report for related European Application No. 14198013.6, dated Sep. 9, 2015.

*Primary Examiner* — Joseph H Feild
*Assistant Examiner* — Rufus C Point
(74) *Attorney, Agent, or Firm* — Lempia Summerfield Katz LLC (57) ABSTRACT

A method and system for automatically generating dynamic virtual fences in a hazardous environment are provided. The method includes detecting a potential hazard associated with a field object in the hazardous environment. The method further includes determining a value of a risk factor of the potential hazard and area and shape of a dynamic virtual fence based on values of real-time operational parameters associated with the field object. The method includes automatically representing the dynamic virtual fence around a location of the field object on a map of the hazardous environment based on the determined area and shape and the value of the risk factor such that the dynamic virtual fence represents a hazardous zone in the hazardous environment.

19 Claims, 7 Drawing Sheets

(56) References Cited

U.S. PATENT DOCUMENTS

| | | | |
|---|---|---|---|
| 8,477,062 B1* | 7/2013 | Kanellis | G01S 13/94 342/65 |
| 8,754,768 B2* | 6/2014 | Prieto | G06Q 10/10 340/522 |
| 9,082,284 B2* | 7/2015 | Prieto | G06Q 10/10 |
| 9,466,038 B2* | 10/2016 | Kezeu | G06Q 10/063 |
| 2004/0010326 A1 | 1/2004 | Schuster | |
| 2006/0015254 A1* | 1/2006 | Smith | H04W 4/02 702/3 |
| 2011/0314144 A1* | 12/2011 | Goodman | G06Q 10/06 709/224 |
| 2012/0025964 A1* | 2/2012 | Beggs | B60Q 1/2673 340/435 |
| 2012/0112880 A1* | 5/2012 | Meyers | H04W 4/90 340/5.54 |
| 2013/0222573 A1 | 8/2013 | Onuma et al. | |
| 2013/0335221 A1* | 12/2013 | Prieto | G06Q 10/10 340/540 |
| 2014/0085084 A1* | 3/2014 | Ghazarian | H04W 4/023 340/539.13 |
| 2014/0091924 A1* | 4/2014 | Armitage | G08B 21/0415 340/539.11 |
| 2014/0164054 A1* | 6/2014 | Swallow | G08B 21/02 705/7.28 |
| 2014/0222383 A1* | 8/2014 | Eitzman | G06F 17/50 703/1 |
| 2014/0247127 A1* | 9/2014 | Prieto | G06Q 10/10 340/540 |
| 2015/0161553 A1* | 6/2015 | Eggleston | G06Q 10/06311 705/7.15 |

FOREIGN PATENT DOCUMENTS

| | | |
|---|---|---|
| DE | 10324627 A1 | 1/2005 |
| EP | 2631374 A1 | 8/2013 |

* cited by examiner

DYNAMIC VIRTUAL FENCING FOR A HAZARDOUS ENVIRONMENT

This application claims the benefit of EP 14198013.6, filed on Dec. 15, 2014, which is hereby incorporated by reference in its entirety.

BACKGROUND

The present embodiments relate to the field of fencing for a hazardous environment.

A hazard is a situation that poses a level of threat to life, property and environment. Most hazards are dormant or potential with a theoretical risk of harm. However, once a hazard becomes active, the hazard may create an emergency situation. Hazard may occur in manufacturing plants, mining environment, and process plants. An environment where a hazard is prone to occur is termed as 'hazardous environment'. For example, hazard may arise from field objects in the hazardous environment such as boiler, furnace, X-ray devices, slopes in mines, vehicles, toxic fumes and poisonous materials. In the hazardous environment, there may be a plurality of areas or zones that are likely to be affected when the hazard occurs. These areas or zones are known as hazardous zones. Typically, the hazardous zones in the hazardous environment are manually defined based on severity of risk from the hazard that may occur.

It is desirable that personnel and other property such as moving robots or field objects present in the hazardous environment are safe from hazardous zones in the hazardous environment. In order to provide safety in the hazardous environment, typically each hazardous zone is guarded using a fence. The fence encompassing the hazardous zone may be a physical fence made of plastic, metal, or wood, Laser curtains, and the like. These types of fences are static (e.g., area and shape remain constant over a period of time). In the hazardous environment, severity of potential hazard varies in real time with change in real-time operational parameter values of field objects. For example, severity of hazard when a boiler is non-operational is less or zero. In such case, there is no need to define a hazardous zone or a fence covering such hazardous zone. However, when the boiler is operational and temperature and pressure of steam in the boiler is high, the severity of hazard is high. In such case, there is a need to define hazardous zone and also a fence covering the hazardous zone.

Currently, hazardous zones are manually defined assuming severity of hazard and static fence is built around such hazardous zones. In real-time, area of the hazardous zone may be greater than the area of the fence. Also, there are many areas in the hazardous environment for which hazardous zones are not defined manually. This may lead to damage to the property and life of the personnel in the hazardous environment when the hazard become active since the hazardous zones are manually defined and the fence is static.

SUMMARY AND DESCRIPTION

The scope of the present invention is defined solely by the appended claims and is not affected to any degree by the statements within this summary.

The present embodiments may obviate one or more of the drawbacks or limitations in the related art. For example, dynamic virtual fences are automatically generated in a hazardous environment based on values of real-time operational parameters of field objects.

A method of automatically generating dynamic virtual fences for a hazardous environment. The method includes detecting a potential hazard associated with at least one field object in the hazardous environment. The hazardous environment is an environment such as manufacturing plant, processing plant, mines, etc. that is prone to hazards that arise due to high pressure, high temperature, high voltage, high level, toxic fumes, movement of heavy objects, hazardous materials and so on. The hazardous environment includes a plurality of field objects that are cause for the hazard. The field object may be a movable field object such as overhead crane, transporting vehicle, robot, and so on, or immovable field object such as machining tool, boiler, furnace, stockyard, control room, electric substation, and so on. A possibility that a hazard may occur is determined based on an operational status of a field object from which the hazard may occur. According to one or more of the present embodiments, the method includes determining an operational status of the at least one field object, and determining the potential hazard associated with the field object based on the operational status of the field object. For example, if the field object such as a boiler is shut down, there is low possibility of occurrence of a hazard from the boiler. However, if the boiler is operational, then there is a high possibility of occurrence of the hazard from the boiler. Thus, the possibility of a potential hazard from the boiler may be detected based on operational status of the boiler.

The method further includes determining the value of a risk factor of the potential hazard associated with the field object based on values of real-time operational parameters associated with the field object. Each field object captures values of the real-time operational parameters associated with the field object. Based on the values of the real-time operational parameters, the value of the risk factor of the potential hazard is determined. The real-time operational parameters include temperature, pressure, level, speed, velocity, load, etc. The risk factor is an amount of impact of hazard associated with the potential hazard. The amount of impact is directly associated with the values of the real-time operational parameters associated with the field object. For example, if the temperature of the steam of the boiler increases, the amount of impact associated with the potential hazard may also be severe.

The method also includes determining area and shape of a dynamic virtual fence for the field object based on the values of the real-time operational parameters. The dynamic virtual fence defines hazardous zones in the hazardous environment. The area and shape of the hazardous zone depends on the values of the real-time operational parameters associated with the field object. Thus, the area and shape of the dynamic virtual fence is determined using the values of the real-time operational parameters. Then, the method includes automatically representing the dynamic virtual fence around the location of the field object on a map of the hazardous environment based on the area and shape and the value of the risk factor. For example, the map may be a two dimensional map or a three dimensional map. In this manner, the dynamic virtual fence is used to accurately define hazardous zones in the hazardous environment. Advantageously, the dynamic virtual fence provides safety of personnel and other assets in the hazardous environment from the potential hazard.

The method includes determining type of the field object based on an equipment identifier associated with the field object. For example, the type of the field object may be immovable field object or movable field object. A list of equipment identifiers associated with field objects and corresponding types of field object is maintained. Thus, using the list, the type of the field object corresponding to the equipment identifier is determined. The method further includes obtaining a look-up table corresponding to the type of the field object from a look-up table database. The look-up table indicates a plurality of threshold ranges of operational parameters, corresponding values of the risk factor of the potential hazard, and corresponding area and shape of dynamic virtual fences. The method also includes determining a threshold range in the look-up table in which the values of the real-time operational parameters fall from the plurality of threshold ranges of operational parameters.

The method includes determining the value of the risk factor of the potential hazard corresponding to the determined threshold range using the look-up table.

In determining the area and shape of the dynamic virtual fence, the method includes determining area and shape of the dynamic virtual fence that corresponds to the determined threshold range using the look-up table.

The method includes determining a change in the values of the real-time operational parameters associated with the field object. The method also includes determining a value of the risk factor of the potential hazard associated with the field object based on the values of the real-time operational parameters. The method includes determining area and shape of the dynamic virtual fence based on the values of the real-time operational parameters. The method also includes dynamically adjusting the dynamic virtual fence represented on the map of the hazardous environment according to the determined shape and area, and the value of the risk factor. Thus, the dynamic virtual fence is dynamically changed instantaneously on the map as the values in the real-time operational parameters changes. Advantageously, the hazardous zone represented by the dynamic virtual fence is automatically defined based on the changes in the values of the real-time operational parameters.

The method includes continuously monitoring location of personnel in the hazardous environment. The method also includes determining whether any of the personnel is entering the dynamic virtual fence based on the location of the personnel with respect to the dynamic virtual fence. Additionally, the method includes determining whether any of the personnel is located within the dynamic virtual fence based on the location of the personnel with respect to the dynamic virtual fence. The method also includes sending a warning signal to a mobile device of any of the personnel based on the determination. Thus, the warning signal secures the personnel from the hazardous zone. Advantageously, safety of the personnel is provided in the hazardous environment.

An apparatus that includes a processor and a memory coupled to the processor is provided. The memory includes a fence generation module stored in the form of instructions and executable by the processor. The fence generation module is capable of detecting a potential hazard associated with at least one field object in the hazardous environment. The fence generation module is also capable of determining value of a risk factor of the potential hazard associated with the field object based on values of real-time operational parameters associated with the field object. The risk factor indicates amount of impact of the potential hazard. The fence generation module is capable of determining area and shape of a dynamic virtual fence for the field object based on the values of the real-time operational parameters. The dynamic virtual fence represents a hazardous zone in the hazardous environment. The fence generation module is also capable of automatically representing the dynamic virtual fence around location of the field object on a map of the hazardous environment based on the area and shape of the dynamic virtual fence and the value of the risk factor.

Additionally, the fence generation module is capable of determining change in the values of the real-time operational parameters. The fence generation module is further capable of determining a new value of the risk factor of the potential hazard associated with the field object. Then, the fence generation module is capable of determining area and shape of the dynamic virtual fence according to the changed values of the real-time operational parameters. The fence generation module is also capable of dynamically adjusting the dynamic virtual fence represented on the map of the hazardous environment according to the determined shape and area and the new value of the risk factor.

The memory also includes a risk determination module that is capable of continuously monitoring location of personnel in the hazardous environment.

The risk determination module is capable of determining whether any of the personnel is entering the dynamic virtual fence based on the location of the personnel with respect to the dynamic virtual fence.

The risk determination module is capable of determining whether any of the personnel is located within the dynamic virtual fence based on the location of the personnel with respect to the dynamic virtual fence.

The memory includes a notification module that is capable of sending a warning signal to a mobile device of any of the personnel based on the determination.

The apparatus may be a server computer connected to the plurality of field objects and a plurality of mobile devices of the personnel via a network.

BRIEF DESCRIPTION OF THE DRAWINGS

The illustrated embodiments are intended to illustrate but not limit the invention.

DETAILED DESCRIPTION

Various embodiments are described with reference to the drawings, where like reference numerals are used to refer the drawings, and like reference numerals are used to refer to like elements throughout. In the following description, for the purpose of explanation, numerous specific details are set forth in order to provide thorough understanding of one or more embodiments. It may be evident that such embodiments may be practiced without these specific details.

Figure 1:
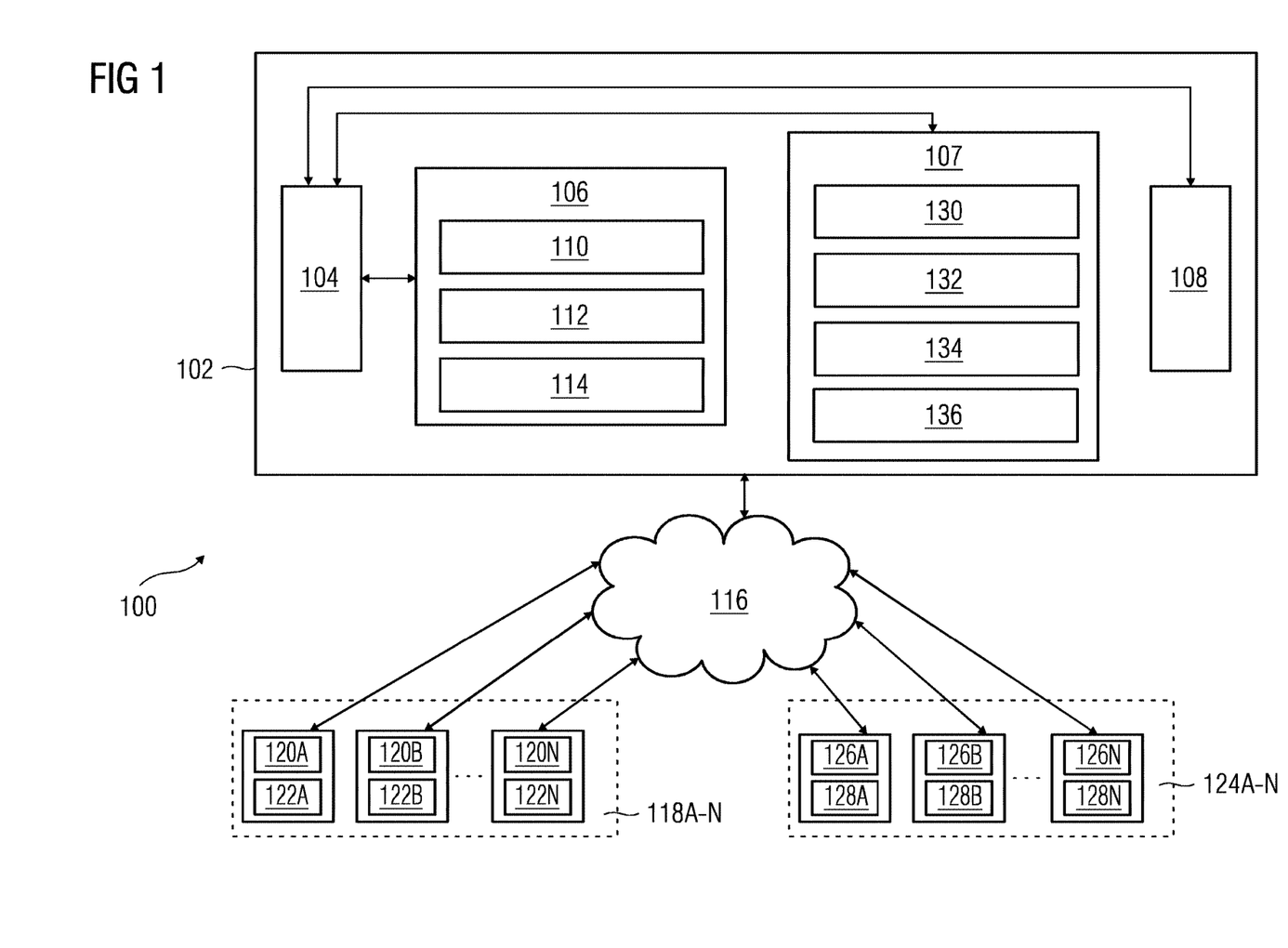
FIG. 1 illustrates a block diagram of a dynamic virtual fencing system deployed in a hazardous environment according to an embodiment.

FIG. 1 illustrates a block diagram of a dynamic virtual fencing system 100 deployed in a hazardous environment according to an embodiment. The hazardous environment may be an industrial setting such as a manufacturing plant, a mining environment, or any other environment that involves risks from hazards. The dynamic virtual fencing system 100 includes a server 102, a plurality of field objects 118A-N deployed in the hazardous environment, and a plurality of mobile devices 124A-N associated with personnel in the hazardous environment. The field objects 118A-N and the mobile devices 124A-N communicate with the server 102 via a network 116.

The server 102 herein may be a single server computer or a group of server computers that perform the functionality in combination. The server 102 includes a processor 104, a memory 106, a storage unit 107, and a communication module 108. The processor 104, as used herein, may be any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 104 may also include embedded controllers, such as generic or programmable logic devices or arrays, application specific integrated circuits, single-chip computers, and the like.

The memory 106 may be volatile memory and non-volatile memory. A variety of computer-readable storage media may be stored in and accessed from the memory 106. The memory 106 may include any suitable elements for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, and the like. The memory 106 includes a fence generation module 110, a risk determination module 112, and a notification module 114. The fence generation module 110, the risk determination module 112, and the notification module 114 may be stored in the memory 106 in the form of machine-readable instructions and executable by the processor 104. These machine-readable instructions when executed by the processor 104 cause the processor 104 to automatically generate a dynamic virtual fence on a map of hazardous environment and provide notifications on the mobile devices 124A-N if any of the personnel is entering the dynamic virtual fence or is located within the dynamic virtual fence. The storage unit 107 includes a non-volatile memory that stores various databases such as a parameter database 130, a location database 132, a look-up table database 134, and a fence information database 136. The communication module 108 enables the server 102 to communicate with the field objects 118A-N and the mobile devices 124A-N via the network 116. For example, the communication module 108 is capable of receiving or transmitting messages from/to the field objects 118A-N and the mobile devices 124A-N. The communication module 108 may support different standard communication protocols such as Transport Control Protocol/Internet Protocol (TCP/IP), Profinet, Profibus, and Internet Protocol Version 4 (IPv4).

The field objects 118A-N include immovable objects or movable objects located in the hazardous environment. The immovable objects include equipment that is permanently or temporarily secured to base or floor. For example, immovable objects may include boilers, pumps, furnaces, machining tools, server rooms, and the like. The movable objects include objects that move from one point to another. For example, the movable objects may include transportation vehicles, crawlers, robots, etc. Typically, the field objects 118A-N are equipped with one or more sensors 120A-N and programmable logic controllers (PLCs) 122A-N. The sensors 120A-N are configured for sensing various real-time operational parameters such as temperature, pressure, speed, direction, revolutions per minute, location, etc. associated with the respective field objects 118A-N. The programmable logic controllers 122A-N are configured for processing the values of the real-time operational parameters sensed by the sensors 120A-N and communicating the values of the real-time operational parameters with the server 102 over the network 116. Each of the field objects 118A-N may not include a dedicated PLC connected to the respective sensors 120A-N. In such a scenario, one or more PLC may be connected to the sensors 120A-N for processing the values of the real-time operational parameters received from the sensors 120A-N.

The handheld or mobile devices 124A-N may be a smart phone, tablet, handheld automation devices, wearable gadget, and the like. The mobile devices 124A-N include positioning modules 126A-N and rendering modules 128A-N. The positioning modules 126A-N may be Global Positioning System (GPS) receivers or indoor positioning modules capable of determining location of the mobile devices 124A-N. The location of the respective mobile devices 124A-N indicates location of the personnel carrying the mobile devices 124A-N. The rendering modules 128A-N may be display units capable of rendering a map of the hazardous environment showing dynamic virtual fence associated with the respective field objects 118A-N in conjunction with the location of the respective personnel. Also, the rendering module 128A-N is capable of displaying warning signals received from the server 102 (e.g., when the personnel carrying the mobile devices 124A-N are entering the dynamic virtual fence(s)). Although not shown in FIG. 1, each of the mobile devices 124A-N may include a processor for performing various functions such as processing location coordinates, messages received from the server 102 and so on. Each of the mobile devices 124A-N may include a memory for storing machine-readable instructions executable by the processor and a communication module for communicating with the server 102.

In an exemplary operation, the sensors 120A-N in the respective field objects 118A-N measure values of real-time operational parameters associated with the field objects 118A-N. The PLCs 122A-N communicate the values of real-time operational parameters along with location information and an equipment identifier of the respective field objects 118A-N to the server 102. In one embodiment, the PLCs 122A-N instantaneously communicate the values of the real-time operational parameters of the respective field objects 118A-N to the server 102. For example, if change in temperature of steam in the boiler is recorded, a PLC associated with the boiler instantaneously sends a recorded value of temperature of the steam to the server 102. In another embodiment, the server 102 continuously sends a request to provide the values of the real-time operational parameters of the field objects 118A-N to the respective PLCs 122A-N. Accordingly, the respective PLCs 122A-N send the values of the real-time operational parameters to the server 102. The PLCs 122A-N may send the set of parameters in pre-defined data fields of a data packet. For example, in case of Profinet based communication, the PLCs 122A-N communicate the set of parameters in a packet format based on the Profinet protocol.

The communication module 108 receives the values of the real-time operational parameters along with the location information and the equipment identifier from the PLCs 122A-N of the respective field objects 118A-N. The communication module 108 stores the values of the real-time operational parameters in the parameter database 130. Also, the communication module 108 stores the location information in the location database 132.

The fence generation module 110 causes the processor 104 to determine type of field object based on the equipment identifier. For example, the real-time operational parameters may differ from one type of field object to another in the hazardous environment. The type of field object is decided based on severity of hazard that may arise from specific field object, category of field object such as immovable or movable, nature of operation and so on. A list including equipment identifiers of the field objects 118A-N and corresponding type of field object is maintained in the server 102. The processor 104 may access the list and determine the type of field object the real-time operational parameters are related to using the equipment identifier associated with the field objects 118A-N.

The fence generation module 110 causes the processor 104 to determine an operational status of the respective field objects 118A-N and detect a potential hazard associated with the respective field objects 118A-N based on the operational status. For example, the processor 104 determines that a field object is operational based on the values of the real-time operational parameters of the field object. For example, if the field object is in operation, the processor 104 detects possibility of hazard associated with the field object. On the contrary, no possibility of hazard is detected if the field object is shut down or non-operational.

The fence generation module 110 causes the processor 104 to access an appropriate look-up table from the look-up table database 134 based on the type of field object. The look-up table database 134 includes a plurality of look-up tables corresponding to different types of field object. It may be noted that the look-up tables may also be categorized based on severity of hazard, operational parameters, location, etc. The look-up table includes threshold ranges of operational parameters, corresponding values of risk factor of hazard that may be caused from the type of field object, and shape and area of dynamic virtual fences. The risk factor of hazard is an indication of amount of impact that may be caused from a hazard associated with a specific type of field object. For example, the risk factor (RF) of hazard for standard threshold ranges of operational parameters associated with each type of the field objects is computed as follows:

$$RF = W_1 * P_1 + W_2 * P_2 + \ldots + W_n * P_n$$

where, $P_1, P_2, \ldots, P_n$ are standard values of operational parameters, and $W_1, W_2, \ldots, W_n$ are weights defined for the operational parameters. Values of weights for corresponding operational parameters may vary exponentially with increase in value of the corresponding operational parameters. Alternatively, the values of weights may remain constant irrespective of whether the values of the operational parameters change. The value of the risk factor (RF) may range from 0 to N, where N is a positive integer. In an exemplary implementation, a risk factor value '0' indicates that there is low or no risk of hazard from a particular field object while the risk factor value '5' indicates that risk of hazard is high compared to the risk factor value '0'. The risk factor of hazard may change with change in values of real-time operational parameters associated with the field object. For example, if temperature and pressure of a boiler is low, the risk factor of hazard is low. However, if temperature and pressure of the boiler increases gradually, the risk factor of hazard increases as risk of potential hazard is more. The risk factor of hazard may vary from one type of field object to another type of field object. For example, risk of hazard due to increase in speed of a mobile robot wandering in the hazardous environment is more severe than risk of hazard due to increase in speed of a conveyor belt. Thus, values of the risk factor corresponding to threshold ranges for different types of field objects are maintained in different look-up tables in the look-up database 134. For example, a look-up table for a boiler may include three threshold ranges of temperature (e.g., 30-250° C., 300-700° C., 700-800° C., and 800° C. and above) and corresponding severity index values (e.g., '1', '2', '3' and '4').

The fence generation module 110 causes the processor 104 to determine threshold range in the look-up table in which the values of the real-time operational parameters falls. The fence generation module 110 causes the processor 104 to determine value of risk factor of hazard corresponding to the determined threshold range using the look-up table for each of the field objects 118A-N.

Then, the fence generation module 110 causes the processor 104 to determine shape and area of a dynamic virtual fence associated with the respective field objects 118A-N based on the values of the real-time operational parameters associated with the respective field objects 118A-N. For example, the look-up table may also contain pre-determined shape and area of the dynamic virtual fence and the corresponding threshold ranges of operational parameters. Thereafter, the fence generation module 110 causes the processor 104 to determine shape and area of the dynamic virtual fence corresponding to the determined threshold range using the look-up table. The dynamic virtual fence may be regular such as circular, rectangular, hexagonal, elliptical, oval, etc. or irregular in shape. The shape of the dynamic virtual fence may be pre-defined for different threshold ranges. The shape is dependent on area within which impact of the hazard would be felt when the hazard occurs. For example, the area of the dynamic virtual fence is computed and stored in the look-up table based on following equation:

$$\text{Area} = (w_1 * P_1 + w_2 * P_2 + w_3 * P_3 + \ldots + w_n * P_n) + C$$

where $P_1, P_2, P_3, \ldots, P_n$ are standard values of operational parameters, $w_1, w_2, w_3, \ldots, w_n$ are weights corresponding to the operational parameters $P_1, P_2, P_3, \ldots, P_n$, respectively, C is a constant, and value of C indicates minimum area of the dynamic virtual fence.

The fence generation module 110 causes the processor 104 to provide information associated with the dynamic virtual fence to the mobile devices 124A-N via the communication module 108. For example, the information associated with the dynamic virtual fence comprises location of the field objects 118A-N, the equipment identifier associated with the field objects 118A-N, the shape and area of the dynamic virtual fence associated with the field objects 118A-N, the risk factor of the potential hazard and so on. In exemplary implementation, the processor 104 may send the information associated with the dynamic virtual fence to the mobile devices 124A-N in a JavaScript Object Notation (JSON) packet over a transport control protocol/Internet Protocol (TCP/IP) based network. The format of the JSON packet is well known in the art. The processor 104 may communicate the information associated with the dynamic virtual fence in any other message format well known in the art and supported by the mobile devices 124A-N.

Additionally, the fence generation module 110 causes the processor 104 to store information of the dynamic virtual fence associated with each of the field objects 118A-N in the fence information database 136.

Each of the mobile devices 124A-N represents the dynamic virtual fence around the location of the respective field objects 118A-N on a map of the hazardous environment. The map of the hazardous environment is a diagrammatic representation of the hazardous environment showing the field objects 118A-N, the personnel carrying the mobile devices 124A-N, pathways, emergency entry and exit points, etc. in a digital form. In an exemplary implementation, the map may be a three-dimensional (3D) map of the hazardous environment. In another exemplary implementation, the map may be a two dimensional (2D) map. The dynamic virtual fence is an area on a map that encompasses a field object that may be responsible for hazard, representing a hazardous zone in the hazardous environment. The rendering modules 128A-N in the respective mobile devices 124A-N render the dynamic virtual fence around the location of the respective field objects 118A-N on the map of the hazardous environment based on the information received from the server 102. In an exemplary implementation, the dynamic virtual fence may be categorized based on the value of the risk factor of the potential hazard. For example, the dynamic virtual fence rendered on the map may be colored red if the risk factor is high. Similarly, if the risk factor is low, the dynamic virtual fence rendered on the map may be colored green. In this manner, the dynamic virtual fence is automatically generated based on the values of the operational parameters measured in real time. Thus, the dynamic virtual fence assists in preventing the personnel in the hazardous environment from entering a hazardous zone secured by the dynamic virtual fence.

In the hazardous environment, the values of real-time operational parameters of the field objects 118A-N change over a period of time. Whenever the server 102 receives the values of operational parameters, the fence generation module 110 causes the processor 104 to evaluate values of the operational parameters associated with the field objects 118A-N. In case the processor 104 determines that there is a change in the values of operational parameters, the fence generation module 110 causes the processor 104 to determine a risk factor corresponding to the changed values of the real-time operational parameters using associated look-up table. Also, the fence generation module 110 causes the processor 104 to determine new shape and area of the dynamic virtual fence associated with the respective field objects 118A-N based on the changed values of the real-time operational parameters. Accordingly, the fence generation module 110 causes the processor 104 to dynamically adjust the dynamic virtual fence based on the new shape and area of the dynamic virtual fence. In an exemplary implementation, the fence generation module 110 causes the processor 104 to send the new area and shape of the dynamic virtual fence and a new value of the risk factor of the potential hazard to the mobile devices 124A-N. Each of the mobile devices 124A-N represents the dynamic virtual fence according to the new shape and area and the risk factor on the map of the hazardous environment. For example, the dynamic virtual fence is automatically adjusted on the map of hazardous environment based on the new shape and area. Also, the color of the dynamic virtual fence is changed based on the changed value of the risk factor of the potential hazard. In this manner, the dynamic virtual fence may be dynamically altered in response to the change in the values of the real-time operational parameters.

During the above operation, the positioning modules 126A-N continuously send location information of the respective mobile devices 124A-N associated with the personnel to the server 102. The communication module 108 stores the location information of the respective mobile devices 124A-N in the location database 132. The risk determination module 112 causes the processor 104 to monitor location of the mobile devices 124A-N associated with the personnel. Then, the risk determination module 112 determines whether any of the personnel carrying the mobile devices 124A-N is entering the dynamic virtual fence associated with any of the field objects 118A-N in the hazardous environment based on the location information. If it is determined that any of the personnel is entering the dynamic virtual fence, the notification module 114 causes the processor 104 to generate a warning signal indicating that any of the personnel is entering the dynamic virtual fence. The communication module 108 sends the warning signal to the respective mobile devices 124A-N. Accordingly, the respective mobile devices 124A-N alert the personnel based on the warning signal. In one embodiment, the respective mobile devices 124A-N may generate a vibration signal to alert the personnel regarding dynamic virtual fence(s). In another embodiment, the respective mobile devices 124A-N may generate an alarm sound to alert the personnel. In yet another embodiment, the respective mobile devices 124A-N may display an alert message to alert the personnel.

In some embodiments, each of the mobile devices 124A-N tracks location of respective personnel and determines whether the respective personnel are entering the dynamic virtual fence using the information on the dynamic virtual fence. Based on the determination, each of the mobile devices 124A-N alerts the respective personnel regarding the hazardous zone represented by the dynamic virtual fence. In these embodiments, the server 102 need not send the warning signal to the mobile devices 124A-N.

In accordance with the foregoing description, when area and shape of the dynamic virtual fence(s) associated with the field objects 118A-N changes, the risk determination module determines whether any of the personnel is located within the dynamic virtual fence(s) whose area and shape has changed. If any of the personnel is located within the dynamic virtual fence(s), the notification module 114 causes the processor 104 to generate and send a warning signal to the respective mobile devices 124A-N. The warning signal may indicate that the personnel are located within the dynamic virtual fence(s) associated with the field objects. The warning signal may include identifier associated with the dynamic virtual fence(s), location of the personnel, and an equipment identifier associated with the field object. Accordingly, the respective mobile devices 124A-N alerts the personnel to move out of the dynamic virtual fence(s). Also, the notification module 114 causes the processor 104 to send the warning signal to an emergency rescue team in the hazardous environment so that the emergency rescue team can rescue the personnel located within the hazardous zone. Additionally, the emergency rescue team may move out other field objects from the hazardous zone to a safe location in the hazardous environment.

When the hazardous environment is a man-less plant, the fence generation module 110 sends the information associated with the dynamic virtual fence for each of the field objects 118A-N to mobile robots. Also, when any mobile robot is detected to be entering or located within the dynamic virtual fence, the notification module 114 sends the warning signal to the mobile robot so that the mobile robot does not venture into the hazardous zone represented by the dynamic virtual fence.

Figure 2A:
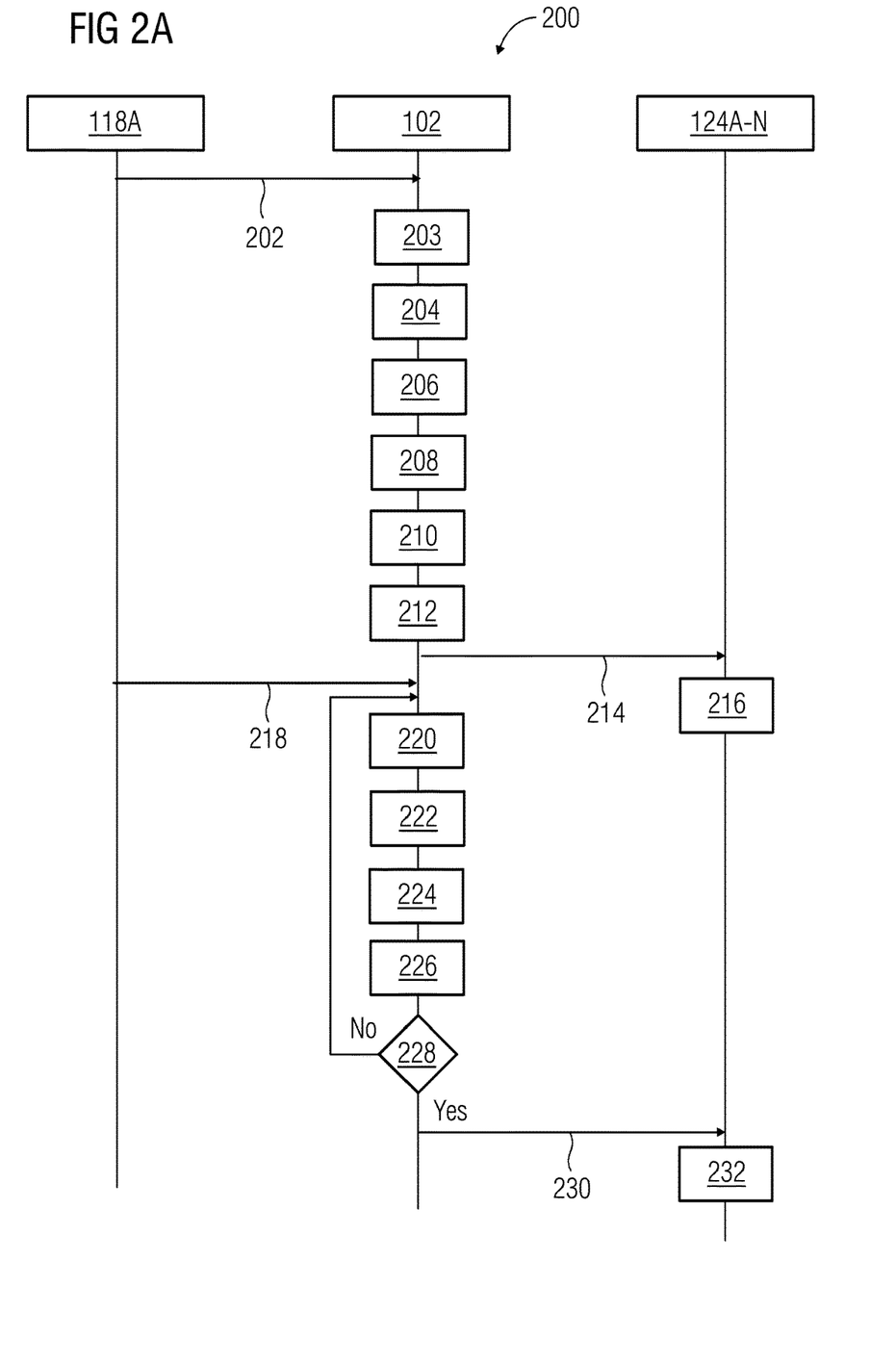
FIG. 2A is a flow diagram illustrating an exemplary process of automatically generating a dynamic virtual fence associated with a field object in the hazardous environment according an embodiment.

FIG. 2A is a flow diagram 200 illustrating an exemplary process of automatically generating a dynamic virtual fence associated with the field object 118A in the hazardous environment according to an embodiment. At act 202, the field object 118A sends a set of parameters to the server 102. For example, the set of parameters may include real-time operational parameters such as pressure, temperature, level, speed, direction and the like, location information associated with the field object 118A, and an equipment identifier of the field object 118A. At act 203, the server 102 determines type associated with the field object 118A based on the equipment identifier. For example, types of field object may be immovable field object and movable field object. Alternatively, types of field object may include boilers, pumps, furnaces, heavy duty vehicles, light duty vehicles, robots, conveyors, etc. Also, the field objects may be categorized based on nature of operation. The server 102 may maintain different types of field object and equipment identifiers of field objects that belongs to each type of field object.

At act 204, the server 102 detects a potential hazard based on the type of the field object 118A. For example, the server 102 detects the potential hazard based on the operational status of the type of the field object 118A. At act 206, the server 102 obtains a look-up table corresponding to the determined type of the field object 118A from the look-up table database 134. The look-up table database 134 stores a plurality of look-up tables associated with different types of field object. The look-up table contains threshold ranges of operational parameters, corresponding values of risk factor of potential hazard, and corresponding area and shape of dynamic virtual fence(s).

At act 208, the server 102 identifies a threshold range that corresponds to the values of the real-time operational parameters associated with the field object 118A from the obtained look-up table. For example, the server 102 determines a threshold range in which the values of the real-time operational parameters lie. At act 210, the server 102 determines value of the risk factor of the potential hazard corresponding to the identified threshold range using the look-up table. At act 212, the server 102 determines area and shape of a dynamic virtual fence associated with the field object 118A corresponding to the identified threshold range. The shape and area depends on the values of the real-time operational parameters.

At act 214, the server 102 provides information associated with the dynamic virtual fence to the mobile devices 124A-N. The information associated with the dynamic virtual fence may consist of the location of the field object 118A, the equipment identifier associated with the field object 118A, the value of the risk factor of the hazard, and the area and shape of the dynamic virtual fence. At act 216, the mobile devices 124A-N render the dynamic virtual fence on a map of the hazardous environment using the information of the dynamic virtual fence. Each dynamic virtual fence rendered on the map represents a potentially hazardous zone in the hazardous environment.

The field object 118A records a change in the values of the real-time operational parameters. At act 218, the field object 118A sends a set of parameters including the changed real-time operational parameters to the server 102. At act 220, the server 102 determines the type of the field object 118A based on the equipment identifier. At act 222, the server 102 obtains a look-up table from the look-up table database 134 based on the type of the field object 118A. At act 224, the server 102 determines value of the risk factor of the potential hazard associated with the field object 118A based on the changed values of the real-time operational parameters of the field object 118A using the look-up table. At act 226, the server 102 computes a new shape and area of the dynamic virtual fence of the field object 118A based on the changed values of the real-time operational parameters using the look-up table. At act 228, the server 102 determines whether the shape and area of the dynamic virtual fence and/or the value of the risk factor of potential hazard has changed over a period of time. If the size and the area and/or the value of the risk factor have not changed, then the process 200 goes to act 220. If the size and area and/or the value of the risk factor have changed, then at act 230, the server 102 provides information associated with the dynamic virtual fence to the mobile devices 124A-N. The information includes the new shape and area of the dynamic virtual fence, the location of the field object 118A, the new value of the risk factor and the equipment identifier of the field object 118A. At act 232, the mobile devices 124A-N dynamically adjust the dynamic virtual fence represented on the map of the hazardous environment based on the new shape and area and the new value of the risk factor. In this manner, the process acts 218 to 230 are repeated until the field object 118A is in operation. Thus, the dynamic virtual fence is dynamically adjusted based on the changes in real-time operational parameters of the field object 118A.

Figure 2B:
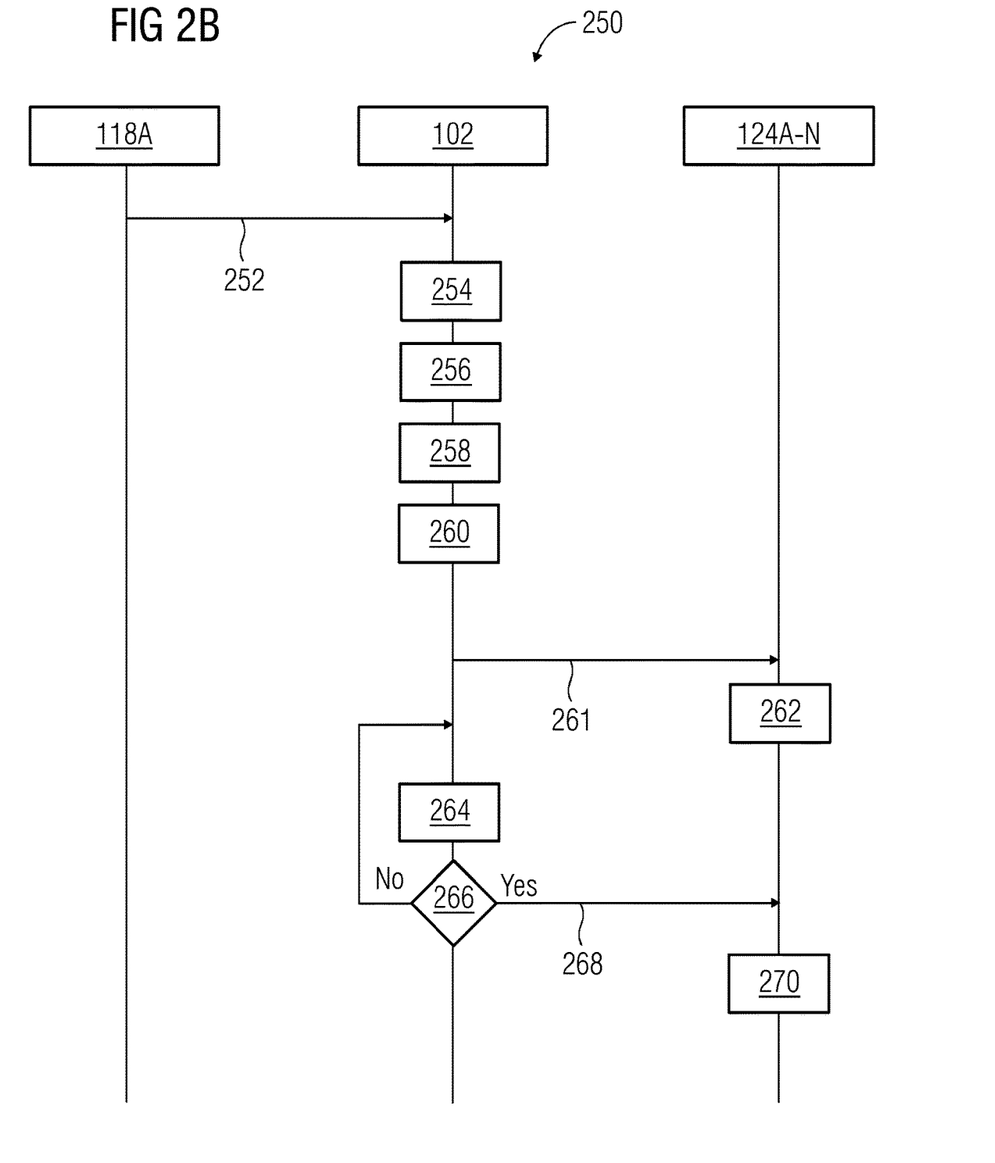
FIG. 2B is a flow diagram illustrating an exemplary process of notifying personnel in a hazardous environment when the personnel are entering a dynamic virtual fence(s) in the hazardous environment according to an embodiment.

FIG. 2B is a flow diagram 250 illustrating an exemplary process of notifying personnel in a hazardous environment when the personnel is entering a dynamic virtual fence(s) in the hazardous environment according to an embodiment. At act 252, the field object 118A sends a set of parameters such as values of real-time operational parameters, location of the field object 118A and equipment identifier associated with the field object 118A. At act 254, the server 102 determines type of the field object 118A based on the equipment identifier. At act 256, the server 102 obtains a look-up table from the look-up table database 134 based on the type of the field object 118A.

At act 258, the server 102 determines value of risk factor of potential hazard associated with the field object 118A based on the real-time operational parameters of the field object 118A using the look-up table. At act 260, the server 102 computes shape and area of a dynamic virtual fence of the field object 118A based on the real-time operational parameters using the look-up table. At act 261, the server 102 provides information associated with the dynamic virtual fence to the mobile devices 124A-N. The information includes the shape and area of the dynamic virtual fence, the location of the field object 118A, the value of the risk factor, and the equipment identifier of the field object 118A. At act 262, the mobile devices 124A-N renders the dynamic virtual fence around the location of the field object 118A on the map of the hazardous environment according to the shape and area and the value of the risk factor.

In order to provide that the personnel in the hazardous environment are safe and outside the dynamic virtual fence, the server 102 continuously monitors location of the mobile devices 124A-N carried by the personnel at act 264. In an exemplary implementation, the mobile devices 124A-N sends location information indicating respective location to the server 102. Accordingly, the server 102 monitors the location of the mobile devices 124A-N. At act 266, the server 102 determines whether any of the personnel is entering the dynamic virtual fence associated with the field object 118A based on the location of the mobile devices 124A-N. In an exemplary implementation, the server 102 compares the location information of each of the mobile devices 124A-N with the location information of the potentially hazardous zone represented by the dynamic virtual fence. If the location of any of the mobile devices 124A-N falls on periphery of the potentially hazardous zone, the server 102 determines that one or more personnel are entering the dynamic virtual fence. Thus, if the server 102 determines that any of the personnel is entering the dynamic virtual fence, then act 268 is performed, else the process 250 goes back to act 266. At act 268, the server 102 sends a warning signal to the respective mobile devices 124A-N indicating that the personnel are entering the hazardous zone. At act 270, the mobile devices 124A-N generates an alert indicating that the personnel are entering the hazardous zone. In some embodiments, the server 102 may determine that the personnel are nearing the potentially hazardous zone and there is likelihood that the personnel will enter the potentially hazardous zone. In such case, the server 102 sends a warning signal to the respective mobile devices 124A-N. Accordingly, the mobile devices 124A-N generates an alert indicating that the personnel are nearing the potentially hazardous zone. In an exemplary implementation, the mobile devices 124A-N may flash the dynamic virtual fence on the map along with an alarm sound. The acts 264 to 270 may be performed in parallel to acts 260 and 262. In such case, the warning signal may also indicate that the personnel are entering the dynamic virtual fence along the information associated with the dynamic virtual fence.

Figure 2C:
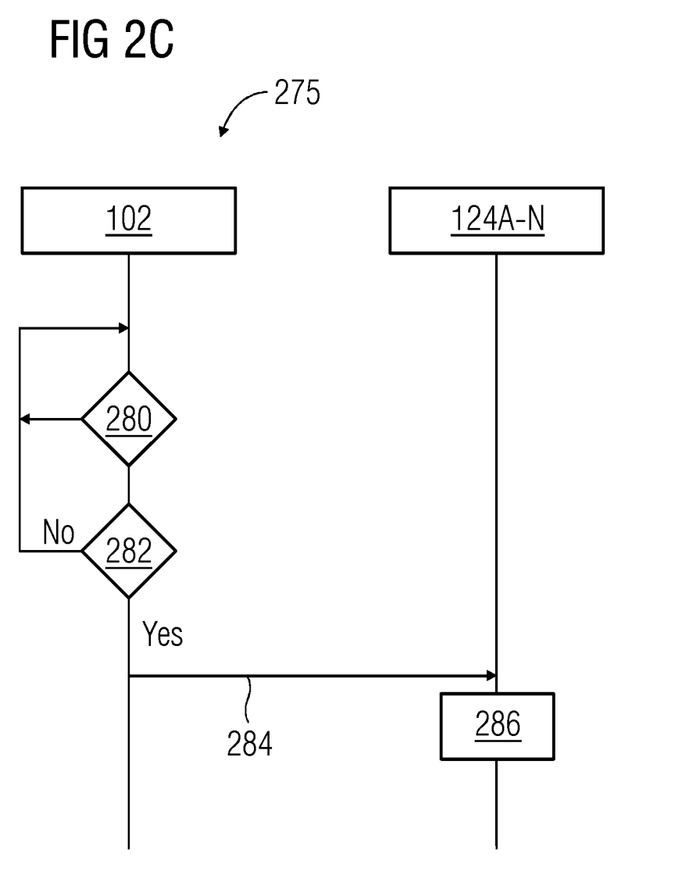
FIG. 2C is a flow diagram illustrating an exemplary process of alerting personnel in a hazardous environment when the personnel are located within a dynamic virtual fence(s) in the hazardous environment according to an embodiment.

FIG. 2C is a flow diagram 275 illustrating an exemplary process of alerting the personnel in a hazardous environment when the personnel are located within a dynamic virtual fence in the hazardous environment according to an embodiment. The field object 118A reports change in values of real-time operational parameters to the server 102. Also, the server 102 determines new area and shape of the dynamic virtual fence based on the changed values of the real-time operational parameters. In such a case, at act 280, the server 102 determines whether there is change in the shape and area of the dynamic virtual fence represented on the map of the hazardous environment. If there is change in the area and shape of the dynamic virtual fence, then at act 282, it is determined whether any of the personnel is located within the dynamic virtual fence represented on the map according to the changed shape and area. If it is determined that any of the personnel is located within the dynamic virtual fence, then at act 284, the server 102 sends a warning signal to the respective mobile devices 124A-N indicating that the personnel are located inside the dynamic virtual fence. Otherwise, act 280 is repeated. Accordingly at act 286, the mobile devices 124A-N generates alert to the personnel based on the warning signal. Also, the server 102 may send the warning signal to an emergency rescue to team in case the value of the risk factor is greater than a preset threshold. For example, the preset threshold may indicate maximum value of risk factor beyond which the emergency rescue is notified. The server 102 may also send the warning signal to the emergency rescue team in case the individual does not come out of the hazardous zone after lapse of a pre-defined time interval from the issue of warning signal.

Figure 3A:
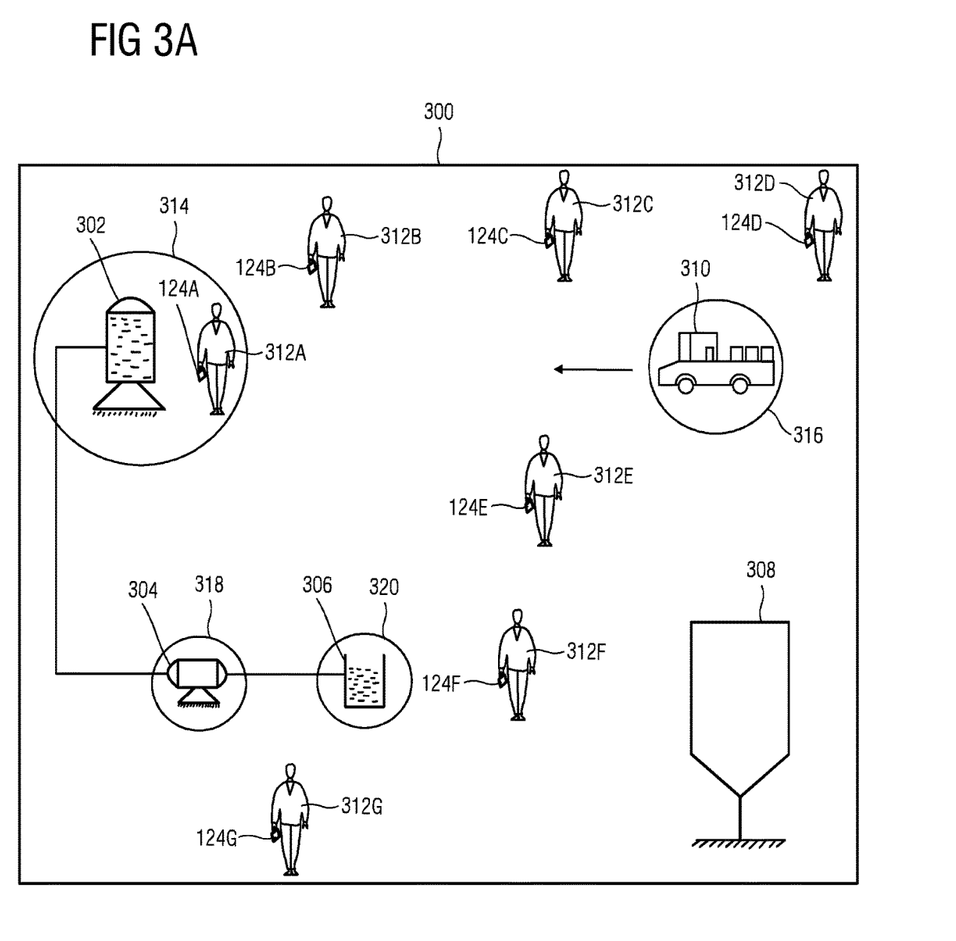
FIGS. 3A to 3C illustrate schematic representations of a map of hazardous environment according to an embodiment.
Figure 3B:
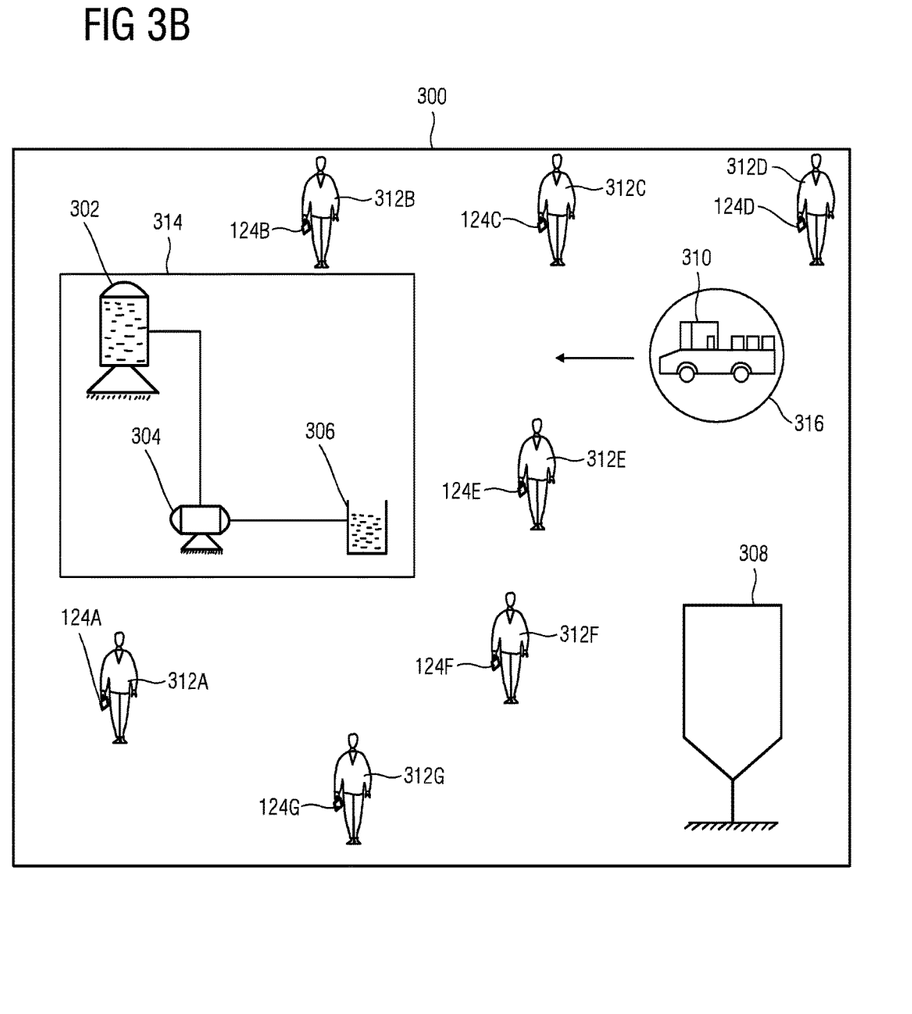
Figure 3C:
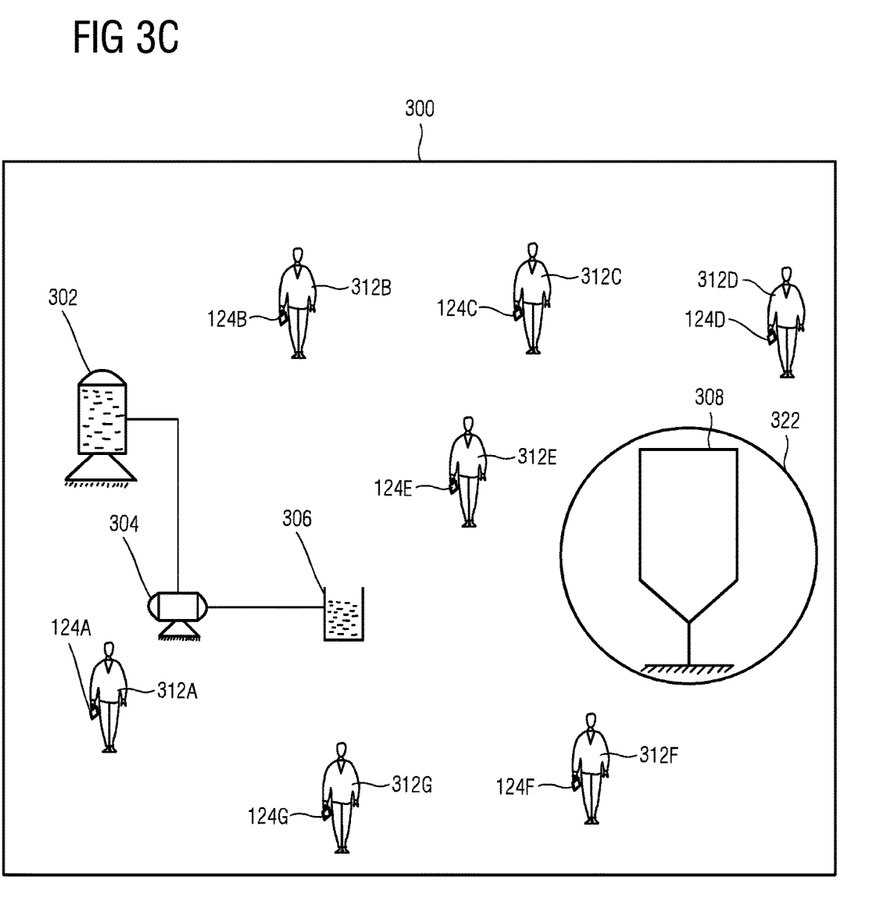

FIGS. 3A to 3C illustrate schematic representations of a map 300 of a hazardous environment according to an embodiment. Particularly, a map 300 of a hazardous environment is shown in FIG. 3A. As shown, the map 300 displays a boiler 302, a pump 304, a tank 306, a furnace 308, a vehicle 310 and a personnel 312A-G carrying the mobile devices 124A-G. For the purpose of illustration, consider that the boiler 302 and the pump 304 are in operation, the vehicle 310 is moving, and the furnace 308 is shut down. Also, consider that the personnel 312A-G are moving within the hazardous environment.

During the operation of the boiler 302, a PLC associated with the boiler 302 sends values of real-time operational parameters to the server 102. The server 102 determines value of risk factor of potential hazard that may arise from the boiler 302 based on the values of the real-time operational parameters using a look-up table. Then, the server 102 determines shape and area of a dynamic virtual fence 314 for the boiler 302 based on the values of the real-time operational parameters using the look-up table. The server 102 communicates the area and shape of the dynamic virtual fence 314 for the boiler 302, the value of the risk factor, the location of the boiler 302, and the equipment identifier of the boiler 302 to the mobile devices 124A-G of the personnel 312A-G. Accordingly, each of the mobile devices 124A-G renders the dynamic virtual fence 314 around the location of the boiler 302 on the map 300 according to the determined shape and area. The dynamic virtual fence 314 drawn around the boiler 302 is of medium size and circular. The dynamic virtual fence 314 represents hazardous zone around the boiler 302. The dynamic virtual fence 314 is shown on the map 300 to prevent the personnel 312A-G from entering the hazardous zone.

As shown from the map 300, an individual 312A is located within the hazardous zone associated with the boiler 302. The server 102 monitors locations of each of the personnel 312A-G in the hazardous environment. The server 102 determines that the individual 312A is located inside the dynamic virtual fence 314 based on the location of the mobile device 124A carried by the individual 312A. The server 102 determines whether the individual 312A is authorized to be present in the hazardous zone based on authorization information. The authorization information may indicate authorization of an individual to remain in a hazardous zone at different risk factor values. For example, the server 102 determines that the individual 312A is not authorized to be present in the hazardous zone at the determined risk factor value. Hence, the server 102 sends a warning signal to the mobile device 124A indicating that the individual 312A is within the hazardous zone and should leave the hazardous zone. Accordingly, the mobile device 312 alerts the individual 312A based on the warning signal. Thus, the alert may enable the individual 312A to move out of the hazardous zone, thereby saving the individual 312A from the hazard.

Also, the server 102 may determine that the individual 312B is moving towards the hazardous zone and is likely to cross the dynamic virtual fence 314 around the location of the boiler 302 based on location of the individual 312B and direction of movement of the individual 312B. In such a case, the server 102 sends a warning signal to the mobile device 124B indicating that the individual 312B is likely to enter the dynamic virtual fence 314. Accordingly, the mobile device 124B alerts the individual 312B that the dynamic virtual fence 314 is ahead. This would prevent the individual 312B from entering the dynamic virtual fence 314 surrounding the boiler 302.

Similarly, a PLC in the vehicle 310 sends real-time operational parameters such as speed and load on the vehicle along with location of the vehicle 310 and an equipment identifier of the vehicle 310 to the server 102. The server 102 determines type of field object (e.g., movable equipment) based on the equipment identifier and obtains a look-up table from the look-up table database 134 based on the type of field object. The server 102 determines the value of the risk factor of a potential hazard corresponding to a threshold range, within which the real-time operational parameter falls, using the look-up table. The value of the risk factor depends on the real-time operational parameters such as speed and load on the vehicle 310. If the vehicle 310 carrying heavy load is moving at a higher speed, the value of the risk factor may higher. However, if the vehicle 310 carrying the heavy load is moving at a slower speed, the value of the risk factor is less.

Then, the server 102 determines shape and area of a dynamic virtual fence 318 for the vehicle 310 based on the values of the real-time operational parameters using the look-up table. Accordingly, the server 102 sends information on the dynamic virtual fence 316 to the mobile devices 124A-G of the personnel 312A-G. The information may include the shape and area of the dynamic virtual fence 316, the location of the vehicle 310, the value of the risk factor, and the equipment identifier of the vehicle 310. Each of the mobile devices 124A-G renders the dynamic virtual fence 316 around the vehicle 310 on the map 300 according to the shape and area and the value of the risk factor. Also, the server 102 determines that the personnel 312D and 312E are moving towards the direction of movement of the vehicle 310 based on the location of the mobile devices 124D and 124E. The server 102 sends a warning signal to the mobile devices 124D and 124E. Accordingly, the mobile devices 124D and 124E generate an alert to the personnel 312D and 312E, respectively. In this manner, the personnel 312D and 312E may be prevented from a potential hazard that may be caused from the vehicle 310.

It may be seen from the map 300 that a dynamic virtual fence 318 around a location of the pump 304 and a dynamic virtual fence 320 around a location of the tank 306 are also generated and rendered on the map 300 based on values of real-time operational parameters associated with the pump 304 and the tank 306, respectively. Thus, as shown in FIG. 3A, a dynamic virtual fence encompassing each field object in a hazardous environment is created and rendered on the map 300 based on the values of the real-time operational parameters of each field object. The dynamic virtual fence defines the hazardous zone in the hazardous environment and provides safety of personnel 312A-G from hazards. According to one or more of the present embodiments, area and shape of the dynamic virtual fence may be adjusted dynamically based on the changed values of the real-time operational parameters. Consider that values of the real-time operational parameters of the boiler 302 have changed over a period of time. In such case, the PLC associated with the boiler 302 sends the new values of the real-time operational parameters of to the server 102. Accordingly, the server 102 computes a new value of the risk factor of hazard associated with the boiler 302 based on the new values of the real-time operational parameters using a look-up table. Then, the server 102 determines new shape and area of the dynamic virtual fence 314 based on the new values of the real-time operational parameters. Accordingly, the server 102 sends information on the new shape and area of the dynamic virtual fence 314 and/or the new value of the risk factor to the mobile devices 124A-G of the personnel 312A-G. Each of the mobile devices 124A-G dynamically adjusts shape and area of the dynamic virtual fence 314 on the map 300 according to the information on the new shape and area and the new value of the risk factor. As shown by FIG. 3B, the area and shape of the dynamic virtual fence 314 has changed with change in values of the real-time operational parameters. For example, the area is increased and shape is changed to rectangular from circular. Thus, the dynamic nature of fence allows adjusting the shape and area based on severity of hazard. When the boiler 302 is non-operational, the dynamic virtual 314 may disappear from the map 300 or reduced to minimum size as there is no risk of hazard from the boiler 302. This is illustrated in FIG. 3C. Also, as shown in FIG. 3C, the furnace 308 is operational, and a PLC associated with the furnace 308 sends values of real-time operational parameters to the server 102. Accordingly, the server 102 sends information on a dynamic virtual fence 322 to the mobile devices 124A-G. Each of the mobile devices 124A-G renders the dynamic virtual fence 322 around the furnace 308 on the map 300 to prevent the personnel 312A-G from entering the dynamic virtual fence 322. The area and shape of the dynamic virtual fence 322 may change over a period of time as values of the real-time operational parameter changes. This provides that the personnel are safeguarded from the hazardous zone at any point of time in the hazardous environment.

One or more of the present embodiments provide a computer program product including program modules accessible from computer-usable or computer-readable medium (e.g., non-transitory computer-readable medium) storing program code for use by or in connection with one or more computers, processors, or instruction execution system. For the purpose of this description, a computer-usable or computer-readable medium may be any apparatus that may contain, store, communicate, propagate, or transport the program for use by or in connection with the instruction execution system, apparatus, or device. The medium may be electronic, magnetic, optical, electromagnetic, infrared, or semiconductor system (or apparatus or device), or propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processors and program code for implementing each aspect of the technology may be centralized or distributed (or a combination thereof) as known to those skilled in the art.

While the present invention has been described in detail with reference to certain embodiments, the present invention is not limited to these embodiments. In view of the present disclosure, many modifications and variations would present themselves to those skilled in the art without departing from the scope of the various embodiments of the present invention, as described herein. The scope of the present invention is, therefore, indicated by the following claims rather than by the foregoing description. All changes, modifications, and variations coming within the meaning and range of equivalency of the claims are to be considered within their scope.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method of automatically generating dynamic virtual fences for a hazardous environment to increase safety for personnel or mobile robots in the hazardous environment, the method comprising:
   detecting, via a processor, a potential hazard associated with at least one field object in the hazardous environment;
   determining, via the processor, a risk factor of the potential hazard associated with the at least one field object based on values of two or more real-time operational parameters associated with the at least one field object;
   determining, via the processor, an area and a shape of a dynamic virtual fence for the at least one field object based on the values of the real-time operational parameters associated with the at least one field object;
   providing, via the processor, a location of the at least one field object, the area and the shape of the dynamic virtual fence for the at least one field object, and the risk factor of the potential hazard associated with the at least one field object to the personnel, mobile robots, or personnel and mobile robots located in the hazardous environment; and
   automatically representing, via the processor, the dynamic virtual fence around a location of the at least one field object on a map of the hazardous environment based on the determined area and shape and a value of the risk factor of the potential hazard; controlling, via the processor, the mobile robots based on the provided location of the at least one field object, the area and the shape of the dynamic virtual fence for the at least one field object, and the risk factor of the potential hazard associated with the at least one field object; or a combination thereof,
   wherein the representation of the dynamic virtual fence around the location of the at least one field object on the map is rendered on a mobile device of the personnel,
   wherein the dynamic virtual fence represents a hazardous zone in the hazardous environment, and the risk factor indicates amount of impact of the potential hazard.

2. The method of claim 1, wherein detecting the potential hazard associated with the at least one field object comprises:
   determining, via the processor, an operational status of the at least one field object; and
   detecting, via the processor, the potential hazard associated with the at least one field object based on the operational status of the at least one field object.

3. The method of claim 1, further comprising:
   determining a type of the at least one field object based on an equipment identifier associated with the at least one field object;
   obtaining a look-up table corresponding to the type of the at least one field object from a look-up table database, wherein the look-up table indicates a plurality of threshold ranges of operational parameters, corresponding values of the risk factor of the potential hazard, and corresponding area and shape of the dynamic virtual fence;
   determining a threshold range in the look-up table in which the values of the real-time operational parameters fall from the plurality of threshold ranges of operational parameters.

4. The method of claim 3, wherein determining the value of the risk factor of the potential hazard associated with the at least one field object comprises determining the value of the risk factor of the potential hazard corresponding to the determined threshold range using the look-up table.

5. The method of claim 3, wherein determining the area and the shape of the dynamic virtual fence comprises determining the area and shape of the dynamic virtual fence, which corresponds to the determined threshold range using the look-up table.

6. The method of claim 1, further comprising:
   determining, via the processor, change in the values of the real-time operational parameters associated with the at least one field object;
   determining, via the processor, a value of the risk factor of the potential hazard based on the changed values of the real-time operational parameters;
   determining, via the processor, area and shape of the dynamic virtual fence based on the changed values of the real-time operational parameters; and
   dynamically adjusting, via the processor, the dynamic virtual fence represented on the map of the hazardous environment according to the determined shape and area and the value of the risk factor.

7. The method of claim 1, further comprising continuously monitoring location of the personnel or mobile robots in the hazardous environment.

8. The method of claim 7, further comprising determining, via the processor, whether any of the personnel or mobile robots is entering the dynamic virtual fence based on the location of the personnel or mobile robots with respect to the dynamic virtual fence.

9. The method of claim 7, further comprising determining, via the processor, whether any of the personnel or mobile robots is located within the dynamic virtual fence based on the location of the personnel or mobile robots with respect to the dynamic virtual fence.

10. The method of claim 8, further comprising sending a warning signal to any of the mobile robots or a mobile device of any of the personnel based on the determination of whether any of the personnel or mobile robots is located within the dynamic virtual fence.

11. An apparatus comprising:
   a processor; and
   a memory coupled to the processor, wherein the memory comprises a fence generation module stored in the form of instructions executable by the processor, the instructions comprising:
      detecting a potential hazard associated with at least one field object in a hazardous environment;
      determining a value of a risk factor of the potential hazard associated with the at least one field object based on values of two or more real-time operational parameters associated with the at least one field object;
      determining area and shape of a dynamic virtual fence for the at least one field object based on the values of the real-time operational parameters associated with the at least one field object;
      providing a location of the at least one field object, the area and the shape of the dynamic virtual fence for the at least one field object, and the value of the risk factor of the potential hazard associated with the at least one field object to personnel or mobile robots located in the hazardous environment; and automatically representing the dynamic virtual fence around a location of the at least one field object on a map of the hazardous environment based on the determined area and shape and the value of the risk factor; controlling the mobile robots based on the provided location of the at least one field object, the area and the shape of the dynamic virtual fence for the at least one field object, and the risk factor of the potential hazard associated with the at least one field object; or a combination thereof, wherein the representation of the dynamic virtual fence around the location of the at least one field object on the map is rendered on a mobile device of the personnel, wherein the dynamic virtual fence represents a hazardous zone in the hazardous environment, and the risk factor indicates an amount of impact of the potential hazard.

12. The apparatus of claim 11, wherein the instructions further comprise:
   determining a change in the values of the real-time operational parameters associated with the at least one field object;
   determining the value of the risk factor of the potential hazard based on the changed values of the real-time operational parameters;
   determining the area and shape of the dynamic virtual fence based on the changed values of the real-time operational parameters; and
   dynamically adjusting the dynamic virtual fence represented on the map of the hazardous environment according to the determined shape and area and the value of the risk factor.

13. The apparatus of claim 11, wherein the memory comprises a risk determination module operable to continuously monitor a location of the personnel or mobile robots in the hazardous environment.

14. The apparatus of claim 13, wherein the risk determination module is operable to determine whether any of the personnel or mobile robots is entering the dynamic virtual fence based on the location of the personnel or mobile robots with respect to the dynamic virtual fence.

15. The apparatus of claim 13, wherein the risk determination module is operable to determine whether any of the personnel or mobile robots is located within the dynamic virtual fence based on the location of the personnel or mobile robots with respect to the dynamic virtual fence.

16. The apparatus of claim 14, wherein the memory comprises a notification module operable to send a warning signal to any of the mobile robots or a mobile device of any of the personnel based on the determination of whether any of the personnel or mobile robots is located within the dynamic virtual fence.

17. The method of claim 1, wherein providing comprises communicating information associated with the location of the at least one field object, the area and the shape of the dynamic virtual fence for the at least one field object, and the risk factor of the potential hazard associated with the at least one field object to any of the mobile robots or to a mobile device of any of the personnel.

18. The method of claim 10, wherein the warning signal comprises:
   a flashing representation of the dynamic virtual fence around the location of the at least one field object on the map rendered on the mobile device, an alarm sound, or combinations thereof;
   instructions for any of the mobile robots to not enter the hazardous zone represented by the dynamic virtual fence; or
   combinations thereof.

19. The apparatus of claim 16, wherein the warning signal comprises:
   a flashing representation of the dynamic virtual fence around the location of the at least one field object on the map rendered on the mobile device, an alarm sound, or combinations thereof;
   instructions for any of the mobile robots to not enter the hazardous zone represented by the dynamic virtual fence; or
   combinations thereof.

* * * * *